United States Patent [19]

George et al.

[11] 4,419,725
[45] Dec. 6, 1983

[54] CACHE/DISK SUBSYSTEM WITH TAGALONG COPY

[75] Inventors: Benjamin T. George, Sunnyvale; Patricia C. Chen, Cupertino, both of Calif.

[73] Assignee: Sperry Corporation, New York, N.Y.

[21] Appl. No.: 207,094

[22] Filed: Nov. 14, 1980

[51] Int. Cl.³ .................. G06F 13/00; G06F 11/16
[52] U.S. Cl. ................................. 364/200; 371/10
[58] Field of Search ..................... 371/10, 21, 31; 364/200 MS File, 900 MS File

[56] References Cited

U.S. PATENT DOCUMENTS

| | | | |
|---|---|---|---|
| 3,636,331 | 1/1972 | Amrehn | 364/200 X |
| 3,737,881 | 6/1973 | Cordi et al. | 364/900 |
| 4,101,969 | 7/1978 | Lawson et al. | 364/900 |
| 4,150,428 | 4/1979 | Inrig et al. | 371/10 X |
| 4,215,460 | 7/1980 | Denko | 364/200 |

Primary Examiner—James D. Thomas
Assistant Examiner—David Y. Eng
Attorney, Agent, or Firm—Griffin, Branigan & Butler

[57] ABSTRACT

A system including a host processor, a disk drive device and a cache store for storing segments of data most recently used or most likely to be used, is provided with a separate store for storing a segment descriptor table. The table has an entry therein corresponding to each segment in the cache store and an entry in the table is formed or reformed each time data is written into its corresponding segment in the cache store. A copy of the segment descriptor table entry thus formed is stored in the cache store at the end of its corresponding data segment. The segment descriptor table entries are normally utilized to manage their corresponding segments. If the store for the table should fail, the copies of the segment descriptor table entries in the cache store may be utilized to control the transfer of data segments in the cache store to their proper locations in disk storage.

4 Claims, 1 Drawing Figure

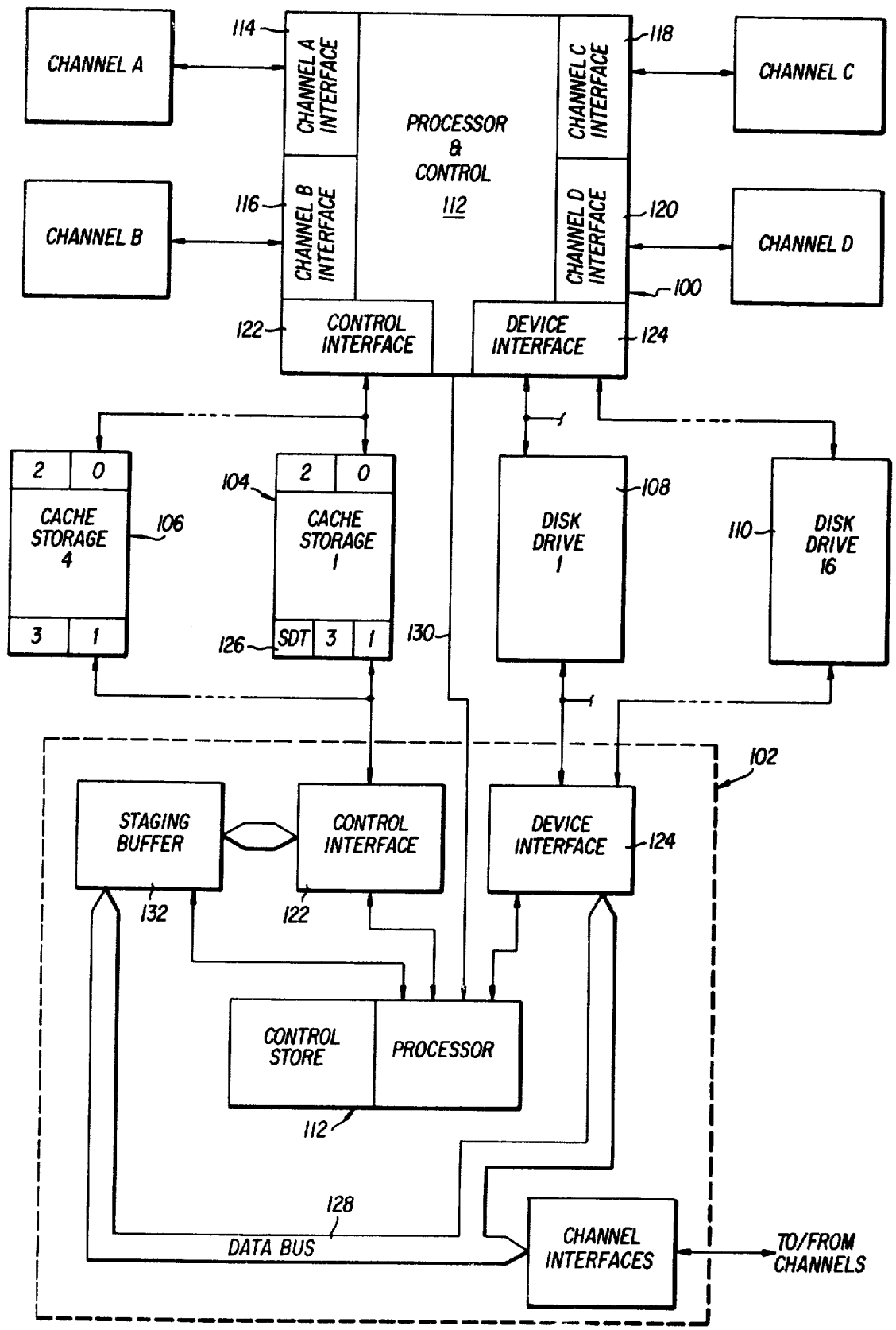

CACHE/DISK SUBSYSTEM WITH TAGALONG COPY

RELATED APPLICATIONS

This application relates to the concurrently filed applications of Robert E. Swenson, Ser. No. 207,097 entitled Cache Disk Subsystem Trickle, and Ser. No. 207,152 entitled Cache/Disk Subsystem, the disclosures of which are incorporated herein by reference.

BACKGROUND OF THE INVENTION

The application of Robert E. Swenson, Ser. No. 207,152, discloses a system wherein a cache store stores segments of data, these segments containing the most recently used, or most likely to be used data. A host processor wishing to initiate a transfer of data to/from the processor from/to a disk devices issues a command to a storage control unit. The command specifies the function (Read or Write) to be performed and also specifies the disk space at which this function is to be performed. The disk space is specified by a starting address and the number of words to be transferred. The storage control unit first determines whether or not a copy of the data from the specified disk space is resident in the cache store. If it is, the storage control unit sets up a data transfer between the cache store and the host processor.

If a copy of the data from the specified disk space is not resident in the cache store then the storage control unit causes the data to be brought from the specified disk space after which the function specified by the command is carried out.

The mechanism by which the storage control unit determines if the data from the specified disk space is resident in the cache store includes a segment descriptor table. The segment descriptor table includes an entry corresponding to each segment in the cache store. Each entry contains various information regarding the segment such as the disk to which it must be returned, the space on the disk to which it must be returned, various indicators indicating such information as whether or not the segment has been written to but not returned to its disk space since being written to, and so forth. Segments in the cache store that have been modified since they were last brought from disk space are returned to their disk space under the control of the segment descriptor table. This transfer takes place as described in application Ser. No. 207,097, when the storage control unit has no other more important task to perform.

The segment descriptor table is stored in a random access memory which is completely separate from the cache store. Should the memory storing the segment descriptor table fail then, in the absence of the present invention, there would be no way for the system described in application Ser. No. 207,152 to access the data segments in the cache store and return them to their appropriate disk space.

SUMMARY OF THE INVENTION

An object of the present invention is to provide an improvement in a cache/disk system of the type having a host processor, a disk drive device for driving a disk, a cache store providing space for storing segments of data, a segment descriptor table store for storing a table of segment descriptor entries, there being an entry in the table corresponding to each segment of data resident in the cache store, and a storage control unit for controlling transfers of data between the host processor, the cache store and the disk, the improvement comprising: means providing additional storage space in the cache store at the end of each data segment storage space, first means in the storage control unit for forming a new segment descriptor table entry each time a data segment in the cache store is written to, second means responsive to the first means for replacing the segment descriptor table entry corresponding to a written-to data segment with the new segment descriptor table entry for the written-to data segment, and, third means responsive to the first means for storing a copy of each new segment descriptor table entry in the cache store in the additional space at the end of its corresponding written-to data segment.

An object of the present invention is to provide an improvement as described above wherein a segment descriptor table entry includes the address of the disk space to which the corresponding segment of data must be transferred for permanent storage, the storage control unit being responsive to the copy of a segment descriptor table entry in the cache store for controlling the transfer of the associated segment of data from the cache store to its disk space if the segment descriptor table store should fail.

Another object of the invention is to provide an improvement as described above wherein the storage control unit includes means responsive to a segment descriptor table entry in the segment descriptor table store for normally controlling the transfer of segments of data from the cache store to their disk spaces during intervals when the storage control unit has no other functions to perform.

Another object of the invention is to provide a method of controlling the transfer of segments of data in a cache store to their spaces on a disk in a cache/disk system having a host processor, a disk drive device for driving a disk, a cache store providing space for storing segments of data, a segment descriptor table store for storing a table of segment descriptor entries, there being an entry in the table corresponding to each segment of data resident in the cache store, and a storage control unit for controlling transfers of data between the host processor, the cache store and the disk, the method comprising: providing additional storage space in the cache store at the end of each data segment of storage space, forming in the storage control unit a new segment descriptor table entry each time a data segment in the cache store is written to, replacing the segment descriptor table entry corresponding to a written-to data segment with the new segment descriptor table entry for the written-to data segment, storing a copy of each new segment descriptor table entry in the cache store in the additional storage space at the end of its corresponding written-to segment, using the segment descriptor table entries in the segment descriptor table store for normally controlling the transfers of data segments from the cache store to their disk spaces, and, using the copies of the segment descriptor table entries in the cache store for controlling the transfers of data segments from the cache store to their disk spaces in the event of failure of the segment descriptor table store.

Other objects of the invention and its mode of operation will become apparent upon consideration of the following description and accompanying drawing.

BRIEF DESCRIPTION OF THE DRAWING

The single FIGURE comprises a block diagram of a cache/disk system.

DETAILED DESCRIPTION OF THE INVENTION

The drawing illustrates a cache/disk subsystem as described in application Ser. No. 207,152. A subsystem may have one or two storage control units 100 and 102 which interface with up to four host processors (not shown) through channel units A-D. The storage control units also interface with up to four multiported memory devices 104,106, collectively referred to as a cache store. The cabinet of at least one memory unit has therein a random access memory which is independent of the cache store and is illustrated in the drawing as a segment descriptor table store (SDT) 126. The storage control units also interface with a plurality of disk drive devices 108,110 which drive disks (not shown).

The storage control units accept commands transmitted to them by the host processors and control the cache store and disk drive devices to either provide data requested by a command or store data in accordance with a command.

The cache store is a high speed store which stores data in segments of 1792 words each. The cache store contains the data which should be permanently stored in the most recently accessed segments of disk space.

The segment descriptor table stored in the SDT 126 provides the means for accessing the cache store and also the means for determining whether or not the data from the disk space specified by a command is resident in the cache store. The segment descriptor table has an entry therein corresponding to each segment of data currently resident in the cache store. Each entry in the segment descriptor table comprises four words as illustrated in FIG. 16 of application Ser. No. 207,152. The entries are linked together by forward and backward age links and each entry includes information regarding its corresponding segment. This information includes the disk drive device number and addressing information which are used to return a segment of data from the cache store to its proper disk space when the segment of data is no longer wanted in the cache store.

When a host processor wishes to write into disk space it issues a write command to one of the storage control units through a channel. The command is a 4-word command as illustrated in FIGS. 15A-15D of application Ser. No. 207,152. It not only specifies the operation to be performed but also the addressing information defining the disk space at which the write operation is to take place. The addressing information specifies the disk on which the data is to be written, the starting location on the disk, and the number of consecutive data locations to be written, beginning at the starting location.

The storage control unit responds to the write command by bringing the segment descriptor table from SDT 126 into a staging buffer 132. A control store and processor 112 in the storage control unit cause it to check the entries in the segment descriptor table to see if the data segments from all of the disk space involved in the write operation are present in the cache store. If they are, they are brought to the staging buffer 132 and overwritten with data supplied to the storage control unit by the host processor. The rewritten segments are then returned to the cache store. New segment descriptor table entries for the rewritten segments are formed and an indicator is set in them to indicate that the data from this disk space has been modified since being brought to the cache store from a disk. The segment descriptor table is then returned to the SDT 126.

The data written into the cache store is not immediately copied back into its specified disk space. As explained in copending application Ser. No. 207,097, this is accomplished at some later time by either of the storage control units when it has no other more imporant work to do. The storage control unit brings the segment descriptor table entries into the staging buffer 132, checks them to see if the written-to bit is set, and if it is, utilizes the addressing information in the segment descriptor table entries to control the transfers of the written-to segments of data to their proper disk spaces.

If a storage control unit finds that one or more segments of data from the disk space specified in the write command is not presently resident in the cache store, it causes the transfer of these segments to cache store. They are then overwritten as described above. The storage control unit forms a new segment descriptor table entry for each segment written to, and stores the updated table in the SDT store 132.

The present invention relates to that aspect of application Ser. No. 207,152 which discloses a method and means for retrieving segments of data from the cache store and returning them to their specified disk spaces even though the segment descriptor table store may have failed. This is accomplished by providing the cache store with additional storage space at the end of the storage space for each segment of data, and, storing in this additional storage space for each segment a copy of the new segment descriptor table entry corresponding to that segment. The new segment descriptor table entry is also entered into the segment descriptor table and returned to the segment descriptor table store 132 as before.

As long as the segment descriptor table functions normally, it is still used to access the cache store. If the segment descriptor table store should fail, then the copy of the segment descriptor table entry in the cache store may be accessed and used by a storage control unit to control the transfer of the corresponding written-to data segment from the cache store to its location in the disk space.

The generation of a new segment descriptor table entry and its transfer to the additional storage space following its corresponding data segment in the cache store takes place during a Normal Write Control routine. This routine is described in detail at pages 265-283 of application Ser. No. 207,152, the disclosure of which is incorporated herein by reference.

The embodiments of the invention in which an exclusive property or privilege is claimed are defined as follows:

1. In a cache/disk system having a host processor, a disk drive device for driving a disk, a cache store providing space for storing segments of data, a segment descriptor table store for storing a table of segment descriptor entries, there being an entry in said table corresponding to each segment of data resident in said cache store, and a storage control unit for controlling transfers of data between said host processor, said cache store, and said disk, the improvement comprising:

means providing additional storage space in said cache store at the end of each data segment storage space;

first means in said storage control unit for forming a new segment descriptor table entry each time a data segment in said cache store is written to;

second means responsive to said first means for replacing the segment descriptor table entry corresponding to a written-to data segment with the new segment descriptor table entry for the written-to data segment; and, third means responsive to said first means for storing a copy of each new segment descriptor table entry in said cache store in the additional storage space at the end of its corresponding written-to data segment.

2. The improvement as claimed in claim 1 wherein a segment descriptor table entry includes the address of the disk space to which the corresponding segment of data must be transferred for permanent storage;

said storage control unit being responsive to the copy of a segment descriptor table entry in said cache store for controlling the transfer of the associated segment of data from the cache store to its disk space if said segment descriptor table store should fail.

3. The improvement as claimed in claim 2 wherein said storage control unit includes means responsive to a segment descriptor table entry in said segment descriptor table store for normally controlling the transfer of segments of data from said cache store to their disk spaces during intervals when the storage control unit has no other functions to perform.

4. In a cache/disk system having a host processor, a disk drive device for driving a disk, a cache store providing space for storing segments of data, a segment descriptor table store for storing a table of segment descriptor entries, there being an entry in said table corresponding to each segment of data resident in said cache store, and a storage control unit for controlling transfers of data between said host processor, said cache store, and said disk, a method of controlling the transfer of segments of data in said cache store to their spaces on said disk, said method comprising the steps of:

providing additional storage space in said cache store at the end of each data segment storage space;

forming in said storage control unit a new segment descriptor table entry each time a data segment in said cache store is written to;

replacing the segment descriptor table entry corresponding to a written-to data segment with the new segment descriptor table entry for the written-to data segment;

storing a copy of each new segment descriptor table entry in the cache store in the additional storage space at the end of its corresponding written-to segment;

using the segment descriptor table entries in said segment descriptor table store for normally controlling the transfers of data segments from said cache store to their disk spaces; and, using the copies of said segment descriptor table entries in said cache store for controlling the transfers of data segments from said cache store to their disk spaces in the event of failure of said segment descriptor table store.

* * * * *